United States Patent [19]
Isozaki et al.

[11] Patent Number: 6,042,776
[45] Date of Patent: Mar. 28, 2000

[54] APPARATUS FOR RECOVERING ZINC OXIDE FROM DUST

[75] Inventors: Shinichi Isozaki, Yokohama; Noboru Sato, Hiratsuka; Masayuki Watanabe, Yokohama, all of Japan

[73] Assignee: NKK Corporation, Tokyo, Japan

[21] Appl. No.: 09/151,945

[22] Filed: Sep. 11, 1998

Related U.S. Application Data

[62] Division of application No. 08/828,654, Mar. 31, 1997.

[30] Foreign Application Priority Data

Apr. 1, 1996 [JP] Japan ................................. 8-104619
Apr. 1, 1996 [JP] Japan ................................. 8-104620

[51] Int. Cl.[7] ........................................ C22B 9/21
[52] U.S. Cl. .................................. 266/148; 266/157
[58] Field of Search ........................... 266/157, 148

[56] References Cited

U.S. PATENT DOCUMENTS 5,259,863  11/1993  Schneider et al. ................. 266/157
5,540,751   7/1996  Yamamoto et al. .

FOREIGN PATENT DOCUMENTS 6-145830  5/1994  Japan .

*Primary Examiner*—Melvyn Andrews
*Attorney, Agent, or Firm*—Frishauf, Holtz, Goodman, Langer & Chick, P.C.

[57] ABSTRACT

A method for recovering zinc oxide comprises the steps of: agglomerating a dust; charging the agglomerate to a molten iron in a melting furnace; collecting a dust generated from the melting furnace; recycling a part of the collected dust and recovering another part of the collected dust. An apparatus for recovering zinc oxide comprises: an agglomeration unit for agglomerating a dust containing iron oxide and zinc oxide; a melting furnace for accepting the agglomerate and for holding the molten iron for reducing the dust; and at least two units of dust collector for collecting the dust containing zinc oxide generated from the melting furnace.

11 Claims, 7 Drawing Sheets

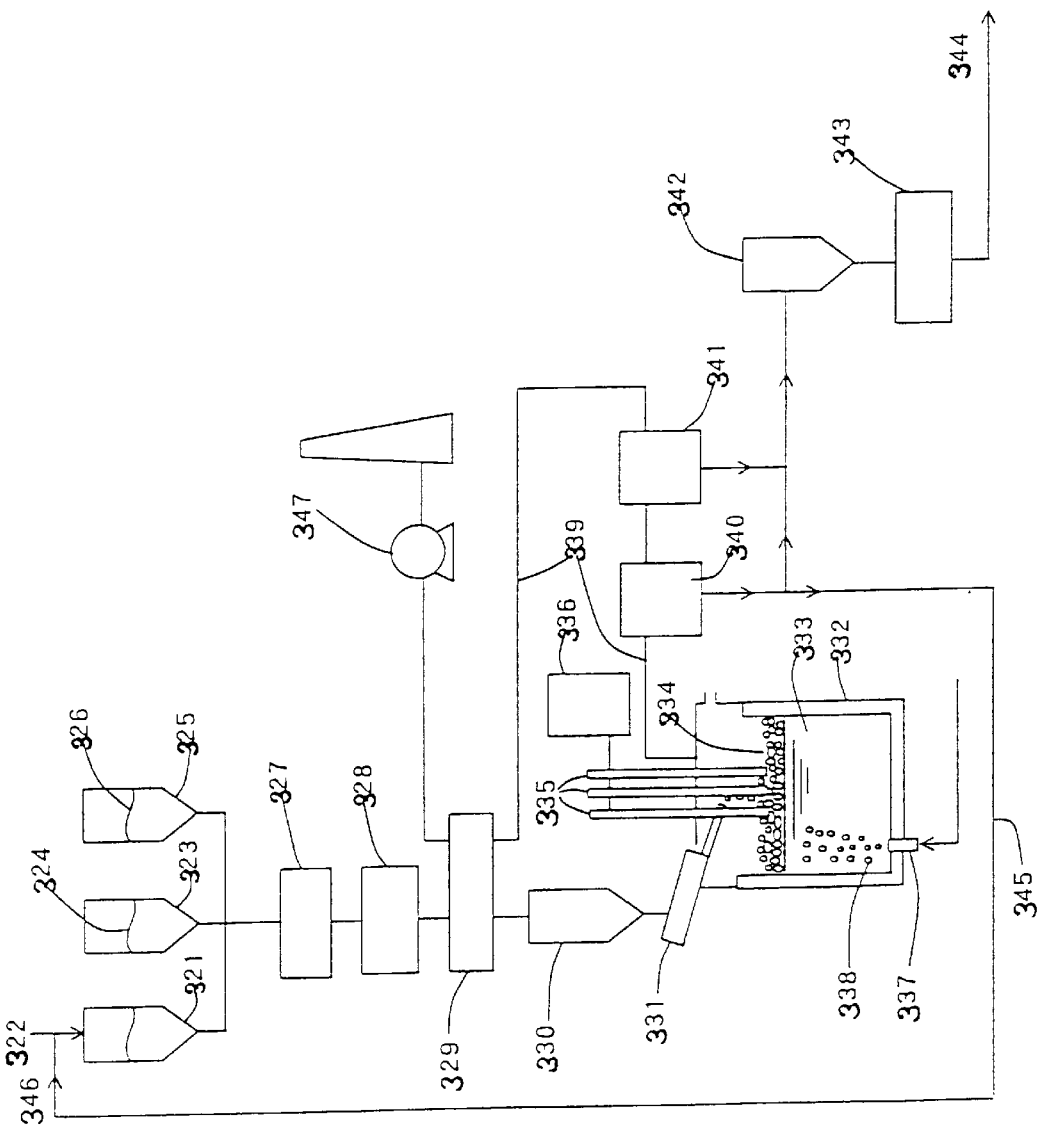

APPARATUS FOR RECOVERING ZINC OXIDE FROM DUST

This application is a division of application No. 08/828,654 filed Mar. 31, 1997.

BACKGROUND OF THE INVENTION

1. Field of the Invention

The present invention relates to a method for recovering zinc oxide from dust containing iron oxide and zinc oxide (ZnO), which dust is generated from steelworks, and also relates to an apparatus therefor.

2. Description of the Related Arts Steelworks which produces iron from raw materials such as iron ores and scrap generates dusts containing large amount of iron oxide. The generated dusts are hereinafter referred to as "steelwork dusts". Typical steelwork dusts are blast furnace dust and converter dust. Percentage of sum of blast furnace dust and converter dust in the total dust generated from steelworks reaches as high as 60%. Main components of blast furnace dust are carbon and iron oxide, and main component of converter dust is iron oxide. Both of these dusts contain zinc ranging from 0.1 to 3 wt. % in a form of mainly zinc oxide, though a small amount of metallic zinc exists.

For recovering iron and carbon components from steelwork dust, steelworks recycles the dust. Since, however, zinc induces scaffolds on the wall within blast furnace, strict control of zinc quantity accumulated in the blast furnace is required for recycling the dust as a raw material to charge into the blast furnace while securing stable operation thereof. Current practice is to limit the quantity of zinc being charged into the blast furnace to 0.1 kg or less per ton of pig iron.

To do this, steelworks separates the dust into high concentration zinc dust and low concentration zinc dust by a dezincing unit such as wet cyclone, and recycles only the low concentration zinc dust as a raw material for charging into the blast furnace. High concentration zinc dust is treated by landfilling. Recently, however, the discharged quantity of high concentration zinc dust has increased to induce a problem of difficulty in dust treatment.

On the other hand, a large quantity of scrap are accumulated in Japan. As a result, the percentage of scrap in available iron source has been increasing even in an integrated process steelworks from the standpoint of effective use of resources. In addition, the percentage of galvanized steel sheets in scrap has increased, which also increases the zinc content in the raw material in steelworks.

Responding to the recent tendency of increasing zinc content in raw materials for steelworks as described above, technology of treating high concentration zinc dust not only by landfilling but also by positively recovering zinc as a zinc source in smelting process is under study. For utilizing the dust as zinc source in smelting process, the zinc concentration is required to be increased as high as possible. In this respect, current target level of the zinc concentration is set to 50 wt. %.

Other than above-described blast furnace steelworks, what is called the electric furnace steelworks also discharge dust. The electric furnace dust contains, however, mainly iron oxide and zinc oxide, accounting for 20 to 30% of iron oxide and 15 to 25% of zinc oxide. Although about 60% of the generated electric furnace dust are recycled as a zinc source for smelting, remained 40% of them are discarded to landfill. Consequently, electric furnace dust also waites for extended use field as a zinc source for smelting as in the case of blast furnace dust and converter dust.

Consequently, for recovering zinc from the above-described steelwork dust and the like to use as the zinc source for smelting process, an important issue is how to concentrate zinc to a level of 50% or more in an efficient way.

Unexamined Japanese patent publication No. 6-145830 discloses a method for recovering zinc from steelwork dust. The technology is described below referring to a drawing. FIG. 4 illustrates the process flow of the technology.

An steelwork dust 2 which was stored in a first hopper 1A is sent to a mixer 4 along with a binder which was stored in a binder hopper 3, then the dust and the binder are mixed together in the mixer 4. The mixture of dust 2 and binder is charged to a pan pelletizer, where the mixture is pelletized. The pellets are cured in a rapid curing unit 6, then they are dried in a drier 7.

The pellets 10 are stored in a pellet hopper 8, from which they are charged into a molten iron ladle 9 along with a molten iron 11. The pellets 10 charged simultaneously with the molten iron 11 are entangled in the molten iron 1, thus dispersing the pellets into the molten iron 11. The iron oxide in the steelwork dust 2 reacts with carbon and silicon in the molten iron and is reduced to iron and recovered in a form of iron into the molten iron.

The zinc oxide in dust is reduced by carbon in the molten iron and vaporized. Then the vaporized reduced zinc oxide is oxidized in air to form fine zinc oxide particles having a size of 10 $\mu$m or less. Above the surface of molten iron, vaporized iron and degradated cold pellets float, which are then collected by a dust collector 13 along with the particles of zinc oxide via a dust collection duct 12.

For increasing the zinc concentration in dust which is collected by the dust collector 13, the dust collected by the dust collector 13 is sent to a second hopper 1B again via a distributor 15 to store, followed by a similar processing as described above. The treatment increases the zinc concentration in dust, and finally the dust recovered in a hopper 1E has 50 wt. % or more zinc concentration, which concentration is significantly high compared with the zinc concentration of 0.1 to 3 wt. % in the original steelwork dust.

The above-described technology, however, has the following problems. The number of dust collector 13 is only one. The dust containing zinc, which is collected by the dust collector 13, is pelletized again for all of them. The re-pelletized dust is charged into the molten iron ladle. The procedure is repeated for 2 to 3 times until the zinc concentration in the dust reaches a target value.

Analysis of thus treated dust revealed that, if the average zinc concentration of the total dust failed to reach the target value, the whole dust have to be re-pelletized and re-reduced in the molten iron ladle, even if a part of the dust were concentrated to a high level. Accordingly, the treatment cost and time for pelletizing, handling, and reducing increase. In addition, increase in the amount of dust for re-treatment increases the investment cost for zinc recovery.

Since the treatment apparatus processes the dust for several times, the necessary scale of apparatud becomes large for the quantity of steelwork dust being processed. Furthermore, the apparatus stops operation thereof when the treated dust reaches a specified concentration, and resumes operation with a fresh raw material. That is, the apparatus is operated in batchwise mode, and the efficiency is unfavorable.

SUMMARY OF THE INVENTION

An object of the present invention is to efficiently and economically recover zinc oxide from dust. To achieve the object, firstly the present invention provides a method for recovering zinc oxide comprising the steps of:

(a) agglomerating a dust;
(b) charging an agglomerate into a molten iron in a melting furnace;
(c) collecting a flue dust generated from the melting furnace;
(d) recycling a first collected dust; and
(e) recovering a second collected dust.

In the step (a), the dust containing iron oxide and zinc oxide is agglomerated to form the agglomerate.

In the step (b), the agglomerate is charged into the molten iron in the melting furnace. Iron oxide and zinc oxide in the agglomerate are reduced in the molten iron. The reduced iron is collected into the molten iron. The reduced zinc is vaporized to become zinc oxide. The melting furnace discharges dust containing zinc oxide.

In the step (c), the dust containing zinc oxide and being discharged from the melting furnace is collected in sequent order of from large particle size stepwise. A preferable number of stages of the dust collection is three. The first stage collects mainly the dust having a particle size of 10 $\mu$m or more from the dust containing zinc oxide discharged from the melting furnace. The second stage collects the dust having a particle size of 5 $\mu$m or more succeeding to the first stage. The third stage collects mainly the dust having a particle size of 0.1 $\mu$m or more succeeding to the second stage.

In the step (d), among the collected dust, the first dust containing zinc oxide of less than the specified concentration is recycled to the agglomeration step (a).

In the step (e), among the collected dust, the second dust containing zinc oxide of the specified concentration or more is recovered as the zinc source.

Secondly, the present invention provides an apparatus for recovering zinc oxide, which comprises:

an agglomeration unit for agglomerating a dust containing iron oxide and zinc oxide to form an agglomerate;
a melting furnace, into which the agglomerate is charged, for holding a molten iron to reduce the dust; and
duct collector means for collecting a flue dust containing zinc oxide generated from the melting furnace in sequent order of from large particle size stepwise.

Thirdly, the present invention provides a method for recovering zinc oxide, which comprises the steps of:

(a) mixing a carbonaceous material for reduction with a dust containing iron oxide and zinc oxide to produce a mixture;
(b) agglomerating the mixture to form an agglomerate;
(c) charging the agglomerate into a melting furnace to reduce the iron oxide and the zinc oxide in molten iron, whereby the reduced iron enters into the molten iron and the reduced zinc vaporizes to become zinc oxide, and a flue dust containing the zinc oxide is generated from the melting furnace;
(d) recovering the flue dust containing zinc oxide generated from the melting furnace.

In the above-described agglomerating step, it is preferable that the added amount of carbonaceous material is 1.5 to 10 times the stoichiometric ratio necessary for reducing iron oxide and zinc oxide existed in the dust. It is also preferable that the dust containing iron oxide and zinc oxide is mixed with carbonaceous material for reduction and with hydraulic additive, and that the mixture is agglomerated. The hydraulic additive is added to the dust so that a slag having a basicity ($CaO/SiO_2$) of 0.5 to 1.5 is formed in the melting furnace.

The charging of the agglomerate into the molten iron is preferably conducted at a charging rate thereof in a range of from 0.2 to 1 ton/hour·$m^2$ of cross sectional area of the melting furnace.

Fourth, the present invention provides an apparatus for recovering zinc oxide, which apparatus comprises:

a reaction furnace, into which an agglomerate is charged, for holding a molten iron;
heating means for heating the molten iron held in a reaction furnace;
agitating means for agitating the molten iron held in the reaction furnace; and
recovering means for recovering zinc oxide generated in the reaction furnace.

The heating means and the agitating means are preferably at least two heating burners located at upper portion of the reaction furnace. On a horizontal plane, the at least two heating burners are positioned to have an angle ranging from 50 to 80 degree relative to radial direction of the reaction furnace. On a vertical plane, the at least two heating burners are positioned to have an angle ranging from 20 to 45 degree relative to horizontal plane.

The agitation means is preferably located on bottom of the melting furnace. Through the agitation means, an agitation gas is injected into the molten iron at a rate of 2 to 10 $Nm^3$/hour per ton of molten iron.

BRIEF DESCRIPTION OF THE DRAWINGS

FIG. 8 is a schematic drawing which illustrates a embodiment of another apparatus for recovering a zinc oxide according to the present invention.

DESCRIPTION OF THE EMBODIMENT

Embodiment 1

Figure 2:
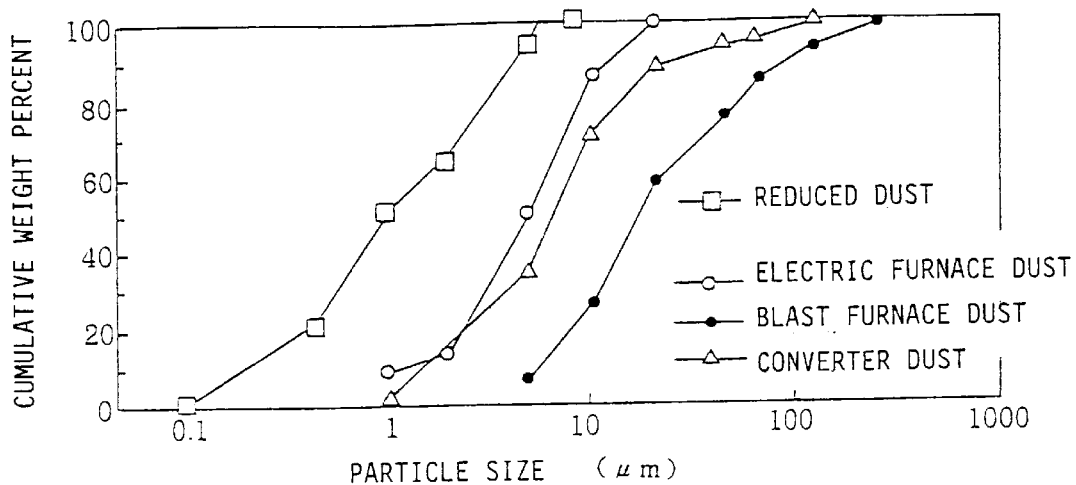
FIG. 2 is a graph showing a particle size distribution of raw material dust and of reduced dust.

FIG. 2 shows particle size distribution of several kinds of steelworks dusts which are specific samples according to the present invention. The particle size distribution gives a sequent order from coarse size: blast furnace dust, converter dust, and electric furnace dust. The Figure also shows the particle size distribution of a dust which was prepared by forming agglomerate from an steelwork dust, by charging the agglomerate into a molten iron held in a melting furnace, and by reducing iron oxide and zinc oxide in the agglomerate in the molten iron, thus generating the dust (hereinafter referred to simply as "reduced dust").

The particle size range is 5 to 300 µm for the blast furnace dust, 1 to 100 µm for the converter dust, and 1 to 20 µm for the electric furnace dust. The particle size range of the reduced dust is from 0.1 to 5 µm, and the average size is about 1.5 µm. Generally, smaller particle size gives higher zinc concentration. Analysis of zinc concentration in each level of particle size on the above-described dusts revealed that the particles having a size of 5 µm or less showed high zinc concentration for all kinds of the dusts.

Particularly for the reduced dust, a scanning electron microscope was used to observe particles in different sizes, and an identification by X-ray was also carried out. The result is that particles having the size of 5 µm or less contain large amount of zinc oxide, and many of the particles having the size of 5 µm or more are iron oxide. Quantitatively, the particles having the size of 5 µm or less show more than 50 wt. % of zinc concentration.

Consequently, by installing plurality of dust collectors each having different size separation performance, or having a separating performance at different particle size, at the exhaust gas line at outlet of the melting furnace, the reduced dusts having different zinc oxide concentration in the generated dust by each other are separately collected. That type of method allows to select the dust having a target zinc concentration, thus allowing to discharge the collected dust having high zinc concentration to outside of the system and to supply them to zinc smelters, and allowing to re-agglomerate the collected dust having low zinc concentration and to charge them to the melting furnace for establishing a continuous recycle system.

Accordingly, when an steelwork dust is agglomerated and is charged into a molten iron in a melting furnace, iron oxide in the dust is reduced in the molten iron, and is collected into the molten iron. Zinc oxide in the dust is reduced and vaporized, and is discharged as zinc oxide dust to outside of the melting furnace. In that case, a part of the charged zinc-containing dust is powdered by receiving thermal shock caused by the molten iron, and is discharged to outside of the system as relatively large particles (5 µm or more) without reduced.

For increasing the zinc concentration in the reduced dust, it is necessary to reduce the amount of coarse non-reduced dust particles. Since, however, the generation of un-reacted dust cannot be completely stopped, the reduced dust which is zinc oxide and the non-reduced dust are separately collected. Only the latter dust having low zinc concentration is re-agglomerated and is charged into the melting furnace for reduction. On the other hand, fine dust particles containing zinc at a specific concentration level or more are able to be supplied to smelters as a zinc source without further processing.

Figure 1:
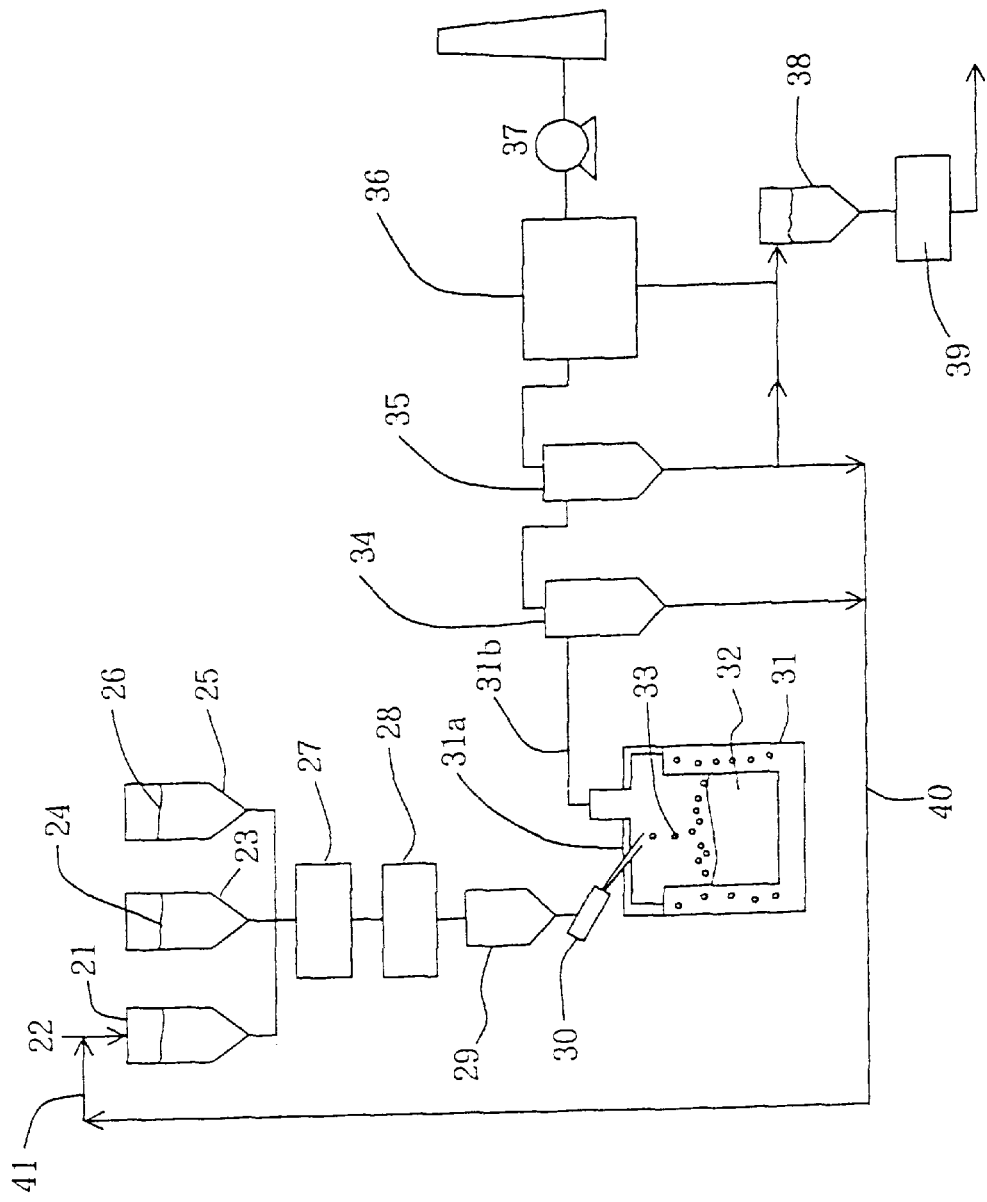
FIG. 1 is a schematic drawing which illustrates an embodiment of a method for recovering a zinc oxide according to the present invention.

Consequently, the present invention adopts a method and an apparatus for recovering zinc, which are shown in FIG. 1. An steelwork dust 22 containing zinc oxide stored in a dust hopper 21 is thoroughly mixed in a mixer 27 together with a coke 24 for reduction stored in a coke hopper 23 and a binder 26 stored in a binder hopper 25. The mixture is formed into an agglomerate in a shape of briquette having a size of 15 to 30 mm in diameter and 10 to 20 mm in thickness in an agglomeration unit 28. Then the agglomerate is charged into a melting furnace 31 by a metering feeder 30 via an intermediate hopper 29.

It is preferable to add a carbonaceous material such as coke for reducing zinc oxide and iron oxide to the agglomerate from the viewpoint of increasing the reduction rate. The agglomeration unit may be a what is called pelletizer.

The melting furnace 31 may be an induction heating melting furnace, and may be other type of furnace such as arc heating furnace and gas heating furnace.

The melting furnace holds a molten iron 32 at a temperature of 1400 to 1600° C. Since the charged agglomerate 33 has a specific gravity ranging from 1.2 to 2.5 $g/cm^3$ which is less than that of molten iron 32, the agglomerate 33 is piled in layers on the surface of molten iron. The iron oxide in the agglomerate is reduced mainly by carbon in the agglomerate and is collected as iron into the molten iron. Zinc oxide is reduced by carbon and other elements in the agglomerate, and is vaporized and oxidized by oxygen in the furnace, thus resulting in fine zinc oxide particles having a size of 10 µm or less, and mostly 5 µm or less.

On the other hand, a part of the zinc-containing dust in the agglomerate is degradated by thermal shock of molten iron, and is discharged to outside of the system in non-reduced state. The non-reduced dust has a particle size of mainly 5 µm or more. A part of iron oxide is also discharged to outside of the system. The dust generated from the melting furnace 31 passes through a duct 31b connected to a furnace lid 31a, and is collected by the first dust collector 34, the second dust collector 35, and the third dust collector 36.

The dust is sucked toward the dust collectors by an exhaust fan 37. It is preferable that the capacity of the exhaust fan 37 is selected at a sufficient volume to reduce the inside pressure of the melting furnace below the atmospheric pressure from the point of acceleration of zinc vaporization. In the embodiment, the separation limit particle size in each dust collector was set as follows, though the limit size is adjustable responding to the particle size distribution of the reduced dust.

First dust collector: 10 µm

Second dust collector: 5 µm

Third dust collector: 0.1 µm

That is, the design of the dust collectors is that the first dust collector collects dust of 10 µm or coarser size, the second dust collector collects dust of 10 to 5 µm of size, and the third dust collector collects dust of 5 to 0.1 µm of size. In concrete terms, the embodiment adopted a normal type cyclone for the first dust collector 34, a high performance cyclone for the second dust collector 35, and a bag filter type dust collector for the third dust collector 36.

Figure 3:
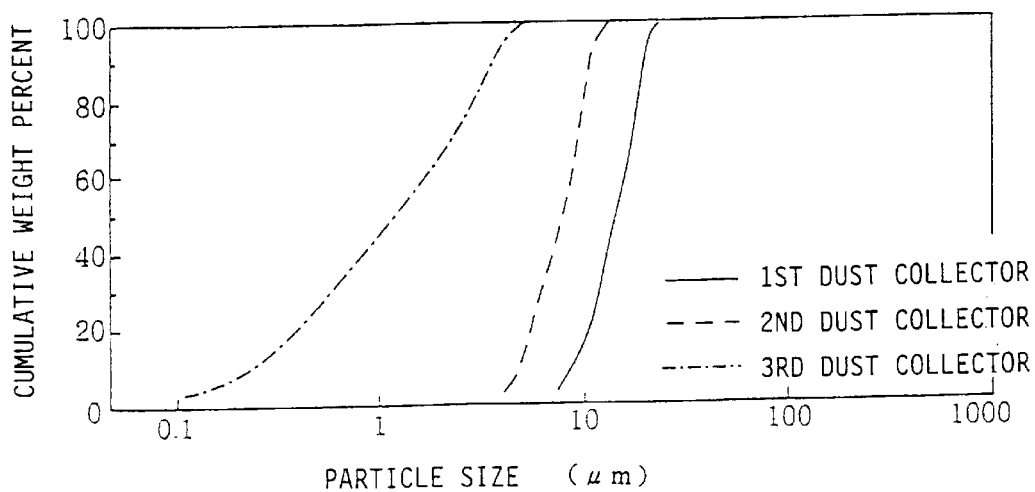
FIG. 3 is a graph showing a particle size distribution of dust collected by a dust collector.
Figure 4:
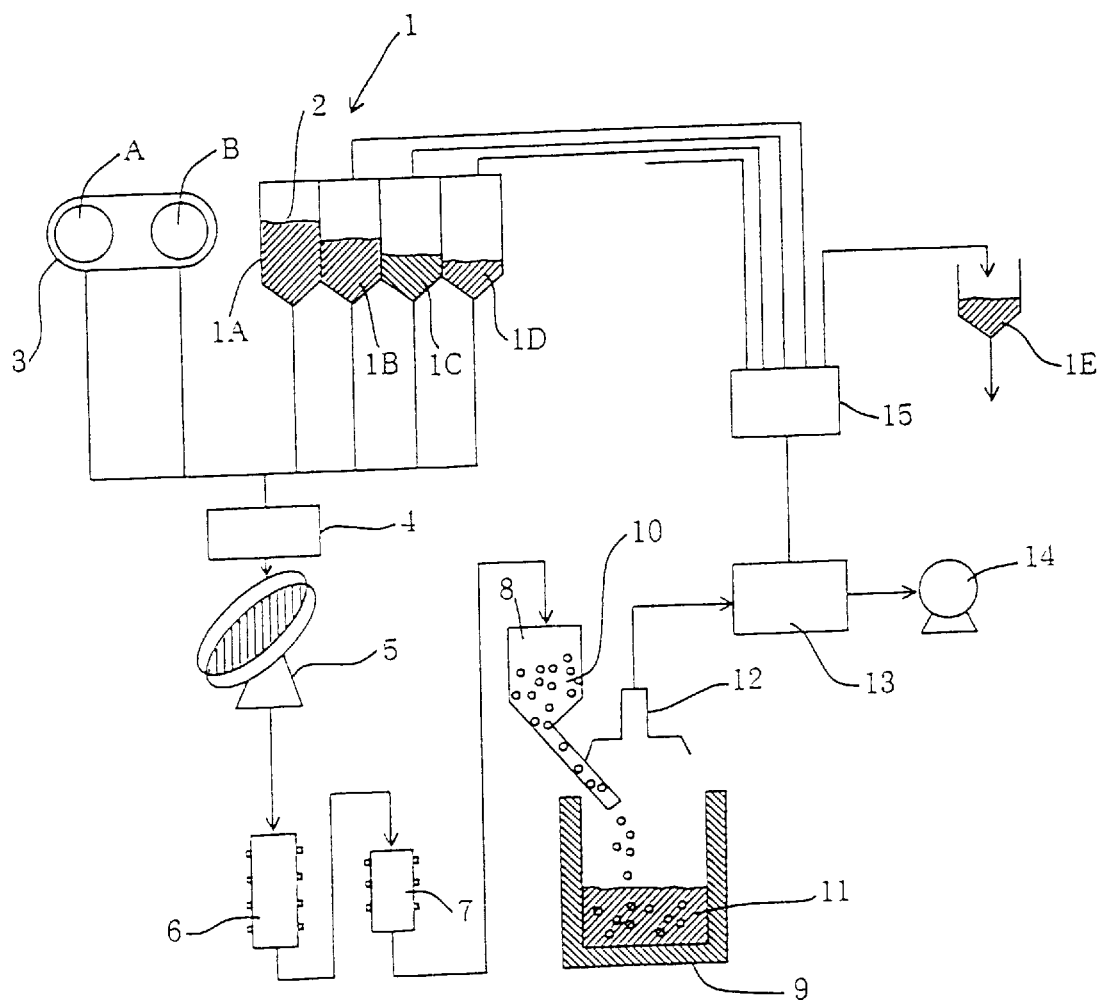
FIG. 4 is a schematic drawing which illustrates a conventional method for recovering a zinc oxide from an steelwork dust.

FIG. 3 shows the particle size distribution of dust collected by each dust collector. The result gave almost the same collection performance with the designed collection performance. Table 1 shows the composition of dust recovered by each dust collector. Since the embodiment set the target zinc concentration to 50% or more, the dust collected by the third dust collector 36 is stored in a product hopper 38.

TABLE 1

|  | Zn | Fe | Others (O, etc.) |
| --- | --- | --- | --- |
| First dust collector | 28 | 38 | 34 |
| Second dust collector | 31 | 34 | 35 |
| Third dust collector | 55 | 4 | 41 |

(wt. %)

The zinc concentration in the dust collected by the first dust collector 34 and the second dust collector 35 was 28 wt. % and 31 wt. %, respectively, so both of which were below the target zinc concentration (50 wt. %). Consequently, the dust was recycled to the dust hopper 21 via a recycle line 40. The recycled dust 41 is recharged to the melting furnace 31 after pelletized again in the agglomeration unit 28, and reduced on the molten iron 32. The weight ratio of the collected dust in each of the three dust collectors (first, second, and third) was approximately 2:3:5.

Since above-described embodiment gave less zinc concentration in the dust collected by the second dust collector 35 than that of target value, the dust was recycled to the dust recycle line 40. If, however, the zinc concentration of the dust exceeds the target value, the process can switch the dust discharge line at the exit of the second dust collector 35 to a route for sending the dust to the product hopper 38.

In this manner, the quantity of recycled dust is kept minimum, thus recovering the dust of high zinc concentration efficiently. The recovered dust is agglomerated by an agglomeration unit 39, then it is supplied to smelters. The smelters use the supplied dust as a zinc source to reproduce zinc.

According to the present invention, as described above, iron oxide which contains zinc is agglomerated, and the agglomerate is charged into the molten iron in a melting furnace to reduce the zinc oxide in the dust to vaporize, then the zinc vapor is recovered in a form of zinc oxide. During the process, the zinc collection unit to collect zinc from the dust contains at least two dust collectors each of which has different size separation limit, thus increasing the zinc concentration in the dust while recycling the dust containing less zinc than the target level again to the treating line at need.

When the zinc concentration in the dust is higher than the target value, the dust is supplied to zinc smelters without applying further treatment. Consequently, the zinc recovery from steelwork dust is performed more efficiently and more economically than conventional process. The method according to the present invention is applicable not only to the steelwork dust but also to iron oxide containing zinc, or sintered ore and iron ore with high zinc concentration.

Embodiment 2

Separate pelletizing of steelwork dust and carbonaceous material for reduction and separate charging them into a melting furnace not necessarily establish a stable and prompt proceed of reduction of zinc oxide in dust.

To the contrary, according to the present invention, a dust containing zinc oxide is mixed with a carbonaceous material for reduction to agglomerate them together, and the agglomerate is added to a molten iron (containing 2 to 4 wt. % of carbon) in a melting furnace. The charged agglomerate is piled in layers in the melting furnace. The piled agglomerate receives heat from the molten iron in the melting furnace to induce reduction of the iron oxide and zinc oxide in the agglomerate by the carbonaceous material in the agglomerate successively beginning from the lowermost agglomerate layer.

In other words, zinc oxide in the dust is promptly reduced by adjacent carbonaceous material to generate zinc vapor, then the vapor is immediately re-oxidized in a space of high oxygen partial pressure at upper portion of the melting furnace, and the oxidized product is recovered as the one with high concentration zinc oxide. As a result, the method according to the present invention achieves drastic increase in the processing capacity of steelwork dust.

The melting furnace is required to sustain endothermic reducing reaction and to keep the temperature of molten iron at around 1500° C. Accordingly, heat supply to the melting furnace is necessary. Any method of heat supply is applicable including induction heating, arc heating, and gas heating. Among various methods for supplying heat, induction heating is relatively simple and easy for heating.

As for the carbonaceous material, coke powder and petroleum coke may be used. If the mixing ratio of carbonaceous material for reduction is less than the above-specified level, the rate of reducing reaction decreases and the fraction of non-reduced dust increases. If, however, the mixing ratio of carbonaceous material exceeds the above-specified level, excess amount of carbonaceous material enters the slag to induce foaming of slag, and the excess carbonaceous material does not contribute to the reducing reaction.

Regarding the quantity of carbonaceous material added to the agglomerate, insufficient mixing rate of the carbonaceous material for reduction results in lack of carbonaceous material for reducing zinc oxide, thus limiting the zinc oxide concentration in the generated dust. According to the present invention, it was confirmed that prompt and stable progress of reducing reaction is established by selecting the mixing ratio of carbonaceous material in dust to 1.5 to 10 times the stoichiometric ratio necessary for reducing zinc oxide and iron oxide.

A hydraulic additive is added as a binder to the dust in the dust agglomeration stage. The hydraulic additive is a material containing CaO. Use of hydraulic additive makes the agglomeration easy and economical.

Although small amount of slag ingredients such as silica and alumina exist in dust, these ingredients are dissolved to appear between the non-reacted agglomerate and the surface of the molten iron. When the flowability of generated slag becomes worse, the occasion of contacting non-reacted agglomerate and the molten iron becomes less to suppress swift proceeding of the reducing reaction.

In this respect, the method according to the invention uses an additive containing CaO as the hydraulic additive to assure the flowability of slag by setting the basicity (CaO/$SiO_2$) of generated slag in a range of from 0.5 to 1.5, more preferably from 1.0 to 1.2, and by setting the melting point of the slag to 1500° C. or below.

A preferable hydraulic additive is Portland cement having approximately 2 of basicity, and is blast furnace granulated slag having approximately 1.5 of basicity. The mixing ratio of the hydraulic additive depends on the composition of the dust. The shape of agglomerate may be pellet or briquette. Pellets produced by ordinary pelletizer are in relatively spherical shape, which are convenient for transfer and charge.

The reducing reaction of zinc oxide in dust proceeds mainly at interface between the surface of molten iron and the agglomerate piled on the molten iron. Accordingly, the quantity of dust charge should depend on the cross sectional area of melting furnace at the top section of molten iron where the agglomerate piles. According to the present invention, solubility tests revealed that the adequate range of charging rate of agglomerate is from 0.2 to 1.0 ton/hour·$m^2$.

Excess charge rate of the agglomerate in the above-described range induces gradual piling of non-reacted agglomerate on the surface of molten iron, and increases the thickness of agglomerate. When the thickness of agglomerate increases, the agglomerate at upper portion of the piled layer decreases its reduction rate because the radiant heat emitted from the molten iron is shielded by the lower portion of the piled layer of agglomerate to result in lack of heat supply, which leads to the suppression of reaction rate and the decrease of reducing rate.

According to the present invention, the dust generated from a melting furnace has small particle size and contains significantly concentrated zinc compared with the steelwork dust as a raw material of agglomerate. Blast furnace dust also has a high zinc concentration in a portion of small particles, and contins mainly iron ore in a portion of large particles. That is, the small particle portion of steelwork dust has high zinc concentration.

Therefore, it is preferable that the dust coming from the above-described reduction process is collected while classifying thereof in terms of particle size using two or more of dust collectors and that the collected dust containing less zinc level is recycled to the treatment process to increase the zinc concentration in dust.

Example

Figure 5:
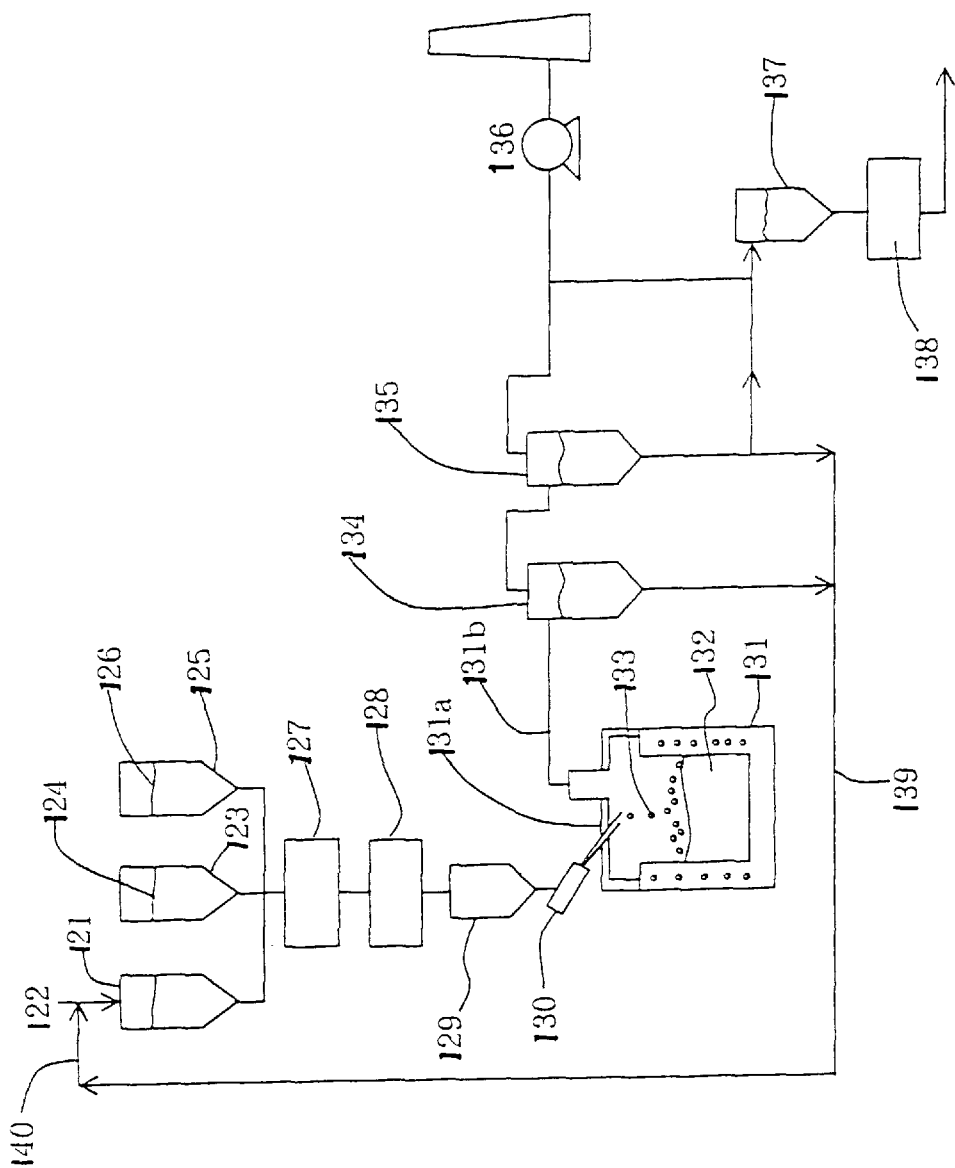
FIG. 5 is a schematic drawing which illustrates another embodiment of a method for recovering a zinc oxide according to the present invention.

A method for recovering zinc from steelwork dust according to the present invention is described below referring to FIG. 5 as an example. FIG. 5 shows a process diagram of an example of zinc recovery from dust according to the present invention. A raw material dust 122 which contains zinc and which was stored in a dust hopper 121 is thoroughly mixed in a mixer 127 together with a coke 124 for reduction which was charged to a coke hopper 123 and a binder 126 which was charged to a binder hopper 125. The mixture is agglomerated into briquettes in a briquetting machine 128 as the agglomerating unit, to an approximate briquette size of 15 to 30 mm in diameter and 10 to 20 mm in thickness.

The briquettes are charged into an induction heating melting furnace 131 having a melting capacity of 1 ton via an intermediate hopper 129 using a metering charge device 130. The induction heating melting furnace 131 holds a molten iron 132 at a temperature ranging from 1400 to 1600° C. Since the specific gravity of charged briquette is in a range of from 1.2 to 2.5 g/cm³, which is less than that of molten iron, the briquettes piles in layers on the surface of molten iron.

Iron oxide in a briquette is reduced mainly by a carbonaceous material in the briquette 133, and is collected as iron into the molten iron. Zinc oxide is also reduced by the carbonaceous material in the briquettes and vaporized, then the vapor is oxidized by oxygen in air which enters into the furnace through an air inlet opened at an upper lid 131a on the induction heating melting furnace 131. The oxidized vapor becomes fine zinc oxide particles in a size of 10 $\mu$m or less. The fine zinc oxide particles pass through a duct 131b and enter dust collectors. On the other hand, a portion of the briquettes is powdered by thermal shock of molten iron, which portion is discharged to outside of the reaction system in non-reacted state along with zinc oxide. A part of iron oxide is also discharged from the surface of molten iron to outside of the reaction system.

The discharged zinc oxide and non-reacted agglomerate are collected by a first dust collector 134 which collects dust mainly in a size of 10 $\mu$m or coarse, and by a second dust collector 135 which collects dust in a size below 10 $\mu$m. Table 2 shows the composition of dust collected by each of the dust collectors. According to the example, the dust collected by the second dust collector 135 is stored in a product hopper 137 because the target zinc oxide concentration is set to 50% or more.

Since the dust collected by the first dust collector 134 contains less zinc than the target zinc concentration, it is returned to the dust hopper 121 via a recycle line 139. The recycled dust 140 is agglomerated again with the raw material dust 122 in the agglomeration unit 128. The resulted ratio of amount of dust in the first and the second dust collectors was 30 wt. % and 70 wt. %, respectively.

With the above-described process, high zinc concentration dust is efficiently recovered by recycling minimum necessary amount of dust. The recovered dust is agglomerated in the agglomeration unit 38, then is supplied to smelters. The smelters treat the supplied dust as zinc source to produce zinc.

TABLE 2

|  | Zn | Fe | Other(O, etc.) |
| --- | --- | --- | --- |
| First dust collector | 31 | 34 | 35 |
| Second dust collector | 52 | 5 | 43 |

(wt. %)

As described above, according to the present invention, a dust containing zinc discharged from steelworks is agglomerated, and the agglomerate is charged to the molten iron in a melting furnace to reduce the iron oxide in the dust within the molten iron to recover thereinto, and the zinc oxide in the dust is reduced to vaporize, then the vaporized zinc is recovered as zinc oxide. In the process, the dust containing zinc oxide is mixed with a carbonaceous material for reduction to agglomerate them together, and the agglomerate is charged into the molten iron in the melting furnace, thus recovering high concentration zinc at a high efficiency and high productivity. Since the apparatus for recovering zinc from dust uses relatively simple dust collectors, the investment cost and the operation cost are at an economical level.

Embodiment 3

According to the present invention, an steelwork dust is mixed with carbon for reduction to agglomerate them together, and the agglomerate is charged to a molten iron in a reaction furnace. The charged agglomerate piles in layers in the reaction furnace. By receiving the heat from the molten iron in the reaction furnace, the zinc oxide is reduced by the carbon in the agglomerate starting from the lowermost layer of the piled agglomerate.

The reducing reaction begins in a reducing atmosphere at a high ambient temperature of 1000° C. or more. Since the reaction rate is large at a high ambient temperature, the zinc recovery needs to secure a high temperature. When, however, the steelwork dust is charged into the molten iron, the sensible heat of dust and the reducing reaction of zinc oxide and of iron oxide decrease the temperature of the molten iron. The sensible heat of exhaust gas and the heat dissipation from the reaction furnace are added to the heat loss, thus the temperature of molten iron significantly decreases. Therefore, the securing of high temperature for zinc recovery becomes difficult unless some heating device is mounted to the reaction furnace.

According to the present invention, a burner combustion unit is located at upper portion of the reaction furnace to combust fuel such as heavy oil or pulverized coal. The formed combustion gas is ejected against the briquettes of the steelwork dust to supply heat necessary for treating thereof. The heat supply avoids the temperature decrease of molten iron, thus allowing to continuous treatment of steelwork dust at a large amount.

The burner unit may be a known one such as heavy oil burner, propane burner, and pulverized coal burner. The quantity of fuel charged to the reaction furnace is determined from heat balance. That is, the heat generated by the combustion of the fuel is equal to the heat necessary to treat the dust, which is the sum of the sensible heat of the dust, the reducing reaction heat of zinc oxide and iron oxide, the sensible heat of exhaust gas, and heat dissipation from the reaction furnace.

For example, the heat necessary to treat 1 ton of steelwork dust is about 900 Mcal which is determined from the heat balance. When heavy oil (calorific value of 10700 kcal/kg) is used as the fuel, and when the effective use efficiency for reaction is assumed as 50%, the necessary fuel is 170 kg. In this case, 170 kg/hour of heavy oil is injected from the burner unit to combust in the reaction furnace should not induce temperature decrease in the furnace, and zinc is recovered by continuous treatment of 1 ton/hour of, for example, electric furnace dust.

Applicable reaction furnace for charging the molten iron is arbitrary including molten iron ladle and tapping ladle used in ordinary steelworks, and exclusive use for dust treatment.

The reducing reaction of zinc oxide in dust occurs mainly at interface between the surface of molten iron and the agglomerate such as briquettes and pellets deposited on the molten iron. Accordingly, a means to agitate the molten iron or the agglomerated steelwork dust deposited on the molten iron to enhance the mixing of both sides across the interface allows to increase the rate of reducing reaction occurred at interface of the agglomerate and the molten iron and to realize the increase in throughput of dust.

According to the present invention, an additional means for agitating the molten iron may be applied such as a gas blowing unit using porous bricks or lance. The gas blowing unit may be mounted at bottom of the reaction furnace to agitate the molten iron from bottom side or mounted at upper part of the reaction furnace to agitate the upper portion of the molten iron. The agitation gas mainly uses an inert gas such as nitrogen gas and argon gas.

The quantity of injection gas depends on the quantity of molten iron. For the case of the bottom-blowing gas unit to agitate the molten iron from bottom side, for example, agitation tests revealed that an adequate blowing rate is in a range of from 2 to 10 $Nm^3$/hour per ton of molten iron. The gas injection nozzle for the bottom blowing unit may be a porous brick or a bundle of small diameter pipes.

The above-described burner unit may be used as an alternative unit for agitating agglomerate. That is, a plurality of burner combustion devices are arranged to blow the flame of combustion gas against the agglomerate to rotate the agglomerate piled on the molten iron in circumferential direction, thus improving the reducing reaction induced at the interface between the molten iron and the agglomerate.

Figure 7:
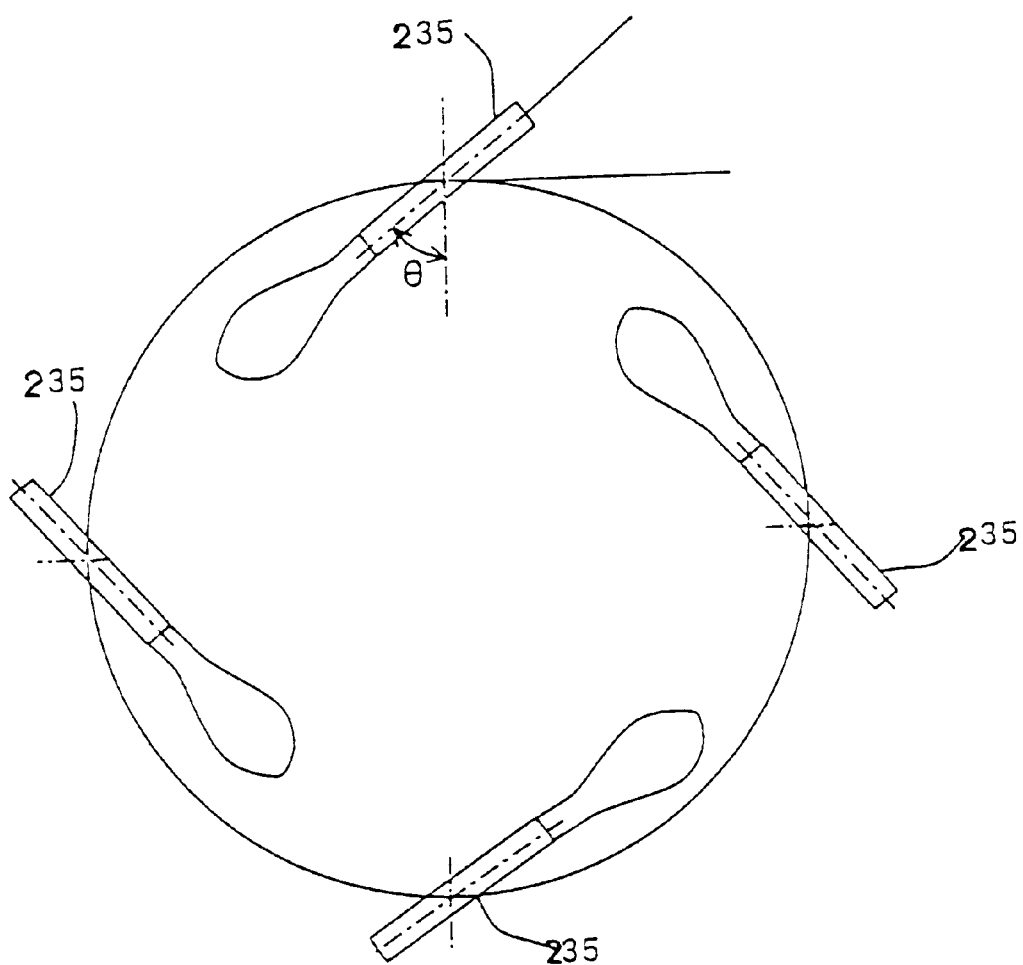
FIG. 7 is a drawing which shows an angle of a burner mounted on a zinc recovery unit according to the present invention.

An adequate number and an adequate tilt angle of the burner devices for forming burner flame to rotate the agglomerate are, according to a series of basic tests, 2 to 4 of the number of burner devices and 50 to 80° of tilt angle θ of the burner device relative to radial direction. FIG. 7 shows the tilt angle of burner device. The structure of burner depends on the viscosity of molten iron in the reaction furnace, the weight of agglomerate, and the cross sectional area of the reaction furnace.

A further alternative unit for agitating the molten iron is a mechanical agitation unit having plurality of blades. By rotating the agitation unit in the molten iron, circumferential motion is induced in the molten iron, thus improving the reaction rate.

The collected dust generated from the reducing reaction contains significantly large amount of zinc compared with the agglomerate of raw material. The collected dust, however, contains a part of the raw material dust. The particle size of the raw material dust is 10 $\mu$m or more, and the zinc concentration is low. The portion that was converted to zinc oxide contains large amount of zinc, and the particle size of that portion is less than 10 $\mu$m.

To cope with the situation, at least two dust collectors are installed. The first dust collector collects the dust having a particle size of 10 $\mu$m or more, and the second dust collector collects the dust having a particle size less than 10 $\mu$m. In this manner, the classified collection of dust in terms of particle size is carried out responding to the zinc concentration. The collected dust containing less zinc is preferably returned to the treating dust to recycle thereof for increasing the zinc concentration in dust.

According to the present invention, agglomeration is conducted by adding a hydraulic additive to an steelwork dust. The agglomerate contains water to an approximate degree of from 1 to 5%. As a result, if the agglomerate is charged to the reaction furnace, heat is consumed for heating and vaporizing the water. Therefore, the sensible heat of gas exhausted from the reaction furnace is utilized to improve the heat efficiency of the total treatment apparatus.

That is, the temperature of the gas exhausted from the reaction furnace is at about 300° C. or more, and the quantity of the exhaust gas is proportional to the quantity of treating dust, or the quantity of generated gas is 10,000 $Nm^3$ per ton of dust treated. It is preferable that the gas is sent to a drying and preheating unit of the agglomerate to dry and preheat directly or indirectly from the viewpoint of thermal efficiency.

Example

Figure 6:
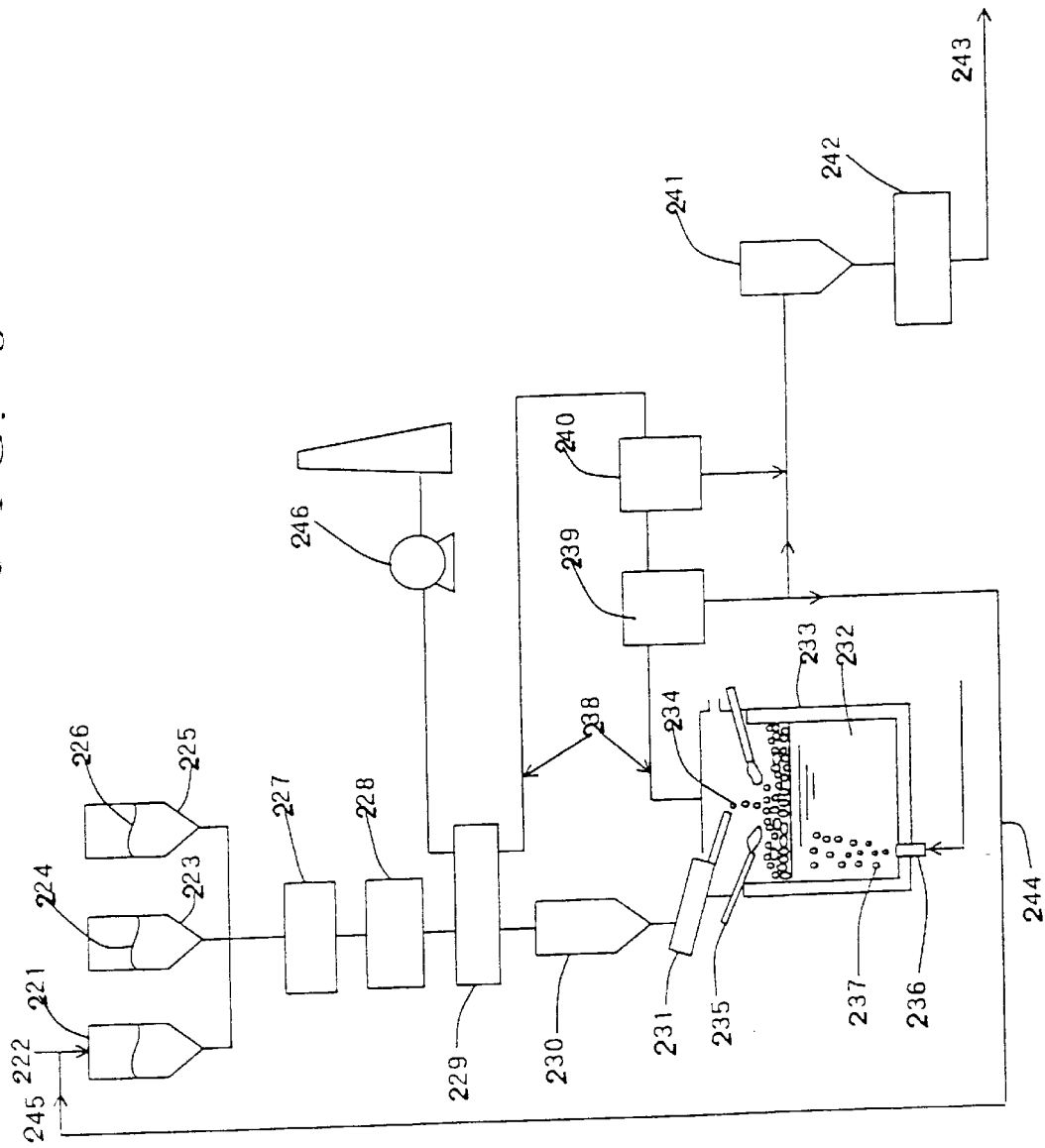
FIG. 6 is a schematic drawing which illustrates a embodiment of an apparatus for recovering a zinc oxide according to the present invention.

A method for recovering zinc from dust according to the present invention is described below referring to FIG. 6 as an example. An steelwork dust 222 which contains zinc and which was stored in a dust hopper 221 is thoroughly mixed in a mixer 227 together with a coke for reduction 224 which was stored in a coke hopper 223 and a binder 226 which was stored in a binder hopper 225. The mixture is agglomerated into briquettes in an agglomeration unit 228 to an approximate briquette size of 15 to 30 mm in diameter and 10 to 20 mm in thickness.

The briquettes are dried and preheated in a drying and preheating unit 229 by an exhaust gas 238, then the briquettes are charged into a reaction furnace 232 via an intermediate hopper 230 using a metering feeder 231. The reaction furnace 232 holds a molten iron 233 at a temperature ranging from 1400 to 1600° C. Since the specific gravity of charged briquette 234 is in a range of from 1.2 to 2.5 g/cm$^3$, which is less than that of molten iron, the briquettes piles in layers on the surface of molten iron.

For preventing temperature decrease of the molten iron, four burner combustion devices 235 are arranged at upper part of the reaction furnace 232 at a tilt angle relative to radial direction. Through the burner combustion devices 235, heavy oil is ejected to burn. The force of the burner flame moves the briquettes piled on the surface of the molten iron to increase the reaction rate. At the bottom section of the reaction furnace, a bottom gas blowing unit 236 is located, through which nitrogen gas 234 is injected into the molten iron to agitate thereof for further increasing the reaction rate.

Iron oxide in the dust is reduced mainly by a carbonaceous material in the briquette, and is collected as iron in the molten iron. Zinc oxide is also reduced by the carbonaceous material in the dust and vaporized, then the vapor is oxidized by oxygen in air which enters into the furnace through an air inlet opened at an upper lid on the reaction furnace 232. The oxidized vapor becomes fine zinc oxide particles in a size of 10 μm or less. On the other hand, a portion of the dust containing zinc as the agglomerated raw material is degradated by thermal shock, which portion is discharged to outside of the reaction system in non-reacted state.

The discharged zinc oxide particles, non-reacted dust, and iron are collected by a cyclone 239 as the first dust collector which collects dust in a size of 10 μm or more, by a cyclone 240 as the second dust collector which collects dust in a size of 10 μm or less. Table 3 shows the composition of dust collected by each of the dust collectors. According to the example, the dust collected by the second dust collector 240 is stored in a product hopper 241 because the target zinc oxide concentration is set to 50% or more.

Since the dust collected by the first dust collector 239 contains less zinc than the target zinc concentration, it is returned to the dust hopper 221 via a recycle line 244. The recycled dust 245 is agglomerated again with the raw material dust 222 in the agglomeration unit 228. The agglomerate is re-charged to the reaction furnace 232 and is treated by reduction on the molten iron 233.

With the above-described process, high zinc concentration dust is efficiently recovered by recycling minimum necessary amount of dust. The recovered dust is agglomerated in the agglomeration unit 228, then is supplied to smelters. The smelters treat the supplied dust as a zinc source to produce zinc.

TABLE 3

|  | Zn | Fe | Other (O, etc.) |
| --- | --- | --- | --- |
| First dust collector | 28 | 38 | 34 |
| Second dust collector | 55 | 4 | 41 |

(wt. %)

As described above, the facility according to the present invention conducts the treatment steps of: agglomerating a dust containing zinc and consisting mainly of iron oxide; charging the agglomerate to a molten iron in a reaction furnace; reducing the iron oxide in the dust in the molten iron to collect thereof into the molten iron; and reducing and vaporizing zinc oxide in the dust to recover the vaporized zinc in a form of zinc oxide.

Since the apparatus is provided with a burner combustion unit for heating and agitating the dust thus preventing temperature reduction of the molten iron, and with an agitator for agitating the molten iron, and further with two or more of dust collectors which collect dust in a sequence of from coarse particles to fine ones, the zinc is recovered at a high concentration with a high efficiency and high productivity.

Embodiment 4

According to the present invention, an steelwork dust containing zinc is mixed with a carbon for reduction such as coke powder, and the mixture is agglomerated. The agglomerate is charged to a molten iron in a melting furnace. The charged agglomerate piles in layers in the melting furnace. The piled agglomerate receives heat from the molten iron in the melting furnace to induce reduction of the zinc oxide in the dust by the carbonaceous material in the agglomerate successively from the lowermost agglomerate layer.

In other words, zinc oxide in the dust is promptly reduced by adjacent carbonaceous material to generate zinc vapor, then the vapor is immediately re-oxidized in a space of high oxygen partial pressure at upper portion of the melting furnace, and the oxidized product is recovered as the one with high concentration zinc oxide. On the other hand, iron oxide in the dust is reduced and collected as iron in the molten iron.

Since the increased amount of the slag and molten iron resulted from the above-described dust treatment process is able to be discharged from the reaction system at arbitrary time by tilting the melting furnace or other method, continuous treatment is sustained if only adequate amount of molten iron exists in the melting furnace. The generated molten iron is able to be reused as a raw material of steel-making by charging thereof into an electric furnace while inducing small quantity of heat loss accounting for heat dissipation to outside of the reaction system.

According to the present invention, arc heat generated from an electrode unit is used to sustain the high temperature necessary for dust treatment. The electric power input to the electrode unit is determined by heat balance. That is, the electric power applied to the electrode unit is equal to the heat necessary for treating dust, which is the sum of the heat loss such as sensible heat of exhaust gas and heat dissipating from the melting furnace, the sensible heat of the dust, and the reducing reaction heat of zinc oxide and iron oxide.

For example, the power necessary to treat 1 ton/hour of dust in a melting furnace is 700 kwh plus 2500 kwh of external heat loss, accounting for 3200 kwh as the total. For example, the size of the melting furnace is 2.6 m in inner diameter and 2.8 m of height with 100 tons of molten iron content, and the dust treatment rate is 1 ton /hour.

The reducing reaction of zinc oxide in dust occurs mainly at interface between the surface of molten iron and the agglomerate piled on the molten iron. Accordingly, a means to agitate the agglomerate piled on the molten iron to enhance the mixing of both sides across the interface allows to increase the rate of reducing reaction occurred at interface of the agglomerate and the molten iron and to realize the increase in throughput of dust.

According to the present invention, a gas blowing unit is installed to the melting furnace. The gas blowing unit may be mounted at bottom of the melting furnace to agitate the molten iron from bottom side or mounted at upper part of the melting furnace to agitate the upper portion of the molten iron. The agitation gas mainly uses inert gas such as nitrogen gas and argon gas.

The quantity of injection gas depends on the quantity of molten iron. In the case that the bottom-blowing gas unit to agitate the molten iron from bottom side, for example, agitation tests revealed that an adequate blowing rate is in a range of from 0.1 to 2 $Nm^3$/hour per ton of molten iron. The gas injection nozzle for bottom blowing unit may be porous bricks or bundle of small diameter pipes.

An alternative unit for agitating molten iron is a mechanical agitation unit having plurality of blades. By rotating the agitation unit in the molten iron, circumferential motion is induced in the molten iron, thus improving the reaction rate. In this manner, the heat necessary for reaction and the agitation force for molten iron are able to be separately controlled on separate variables, thus performing dust reduction treatment efficiently.

According to the present invention, agglomeration is carried out by adding a hydraulic additive to steelwork dust. The agglomerated briquettes contain water to an approximate degree of from 1 to 5%. As a result, if the agglomerated briquettes are charged to the melting furnace, heat is consumed for heating and vaporizing the water. Therefore, the sensible heat of gas exhausted from the melting furnace is utilized to improve the heat efficiency of the total treatment facilities.

That is, the temperature of the gas exhausted from the melting furnace is at about 300° C. or more, and the quantity of the exhaust gas is proportional to the quantity of treated dust, or the quantity of generated gas is 10,000 Nm³ per ton of dust treated. The gas is sent to a drying and preheating unit of the briquettes as the agglomerate to dry and preheat directly or indirectly from the viewpoint of thermal efficiency.

The dust generated from the melting furnace contains significantly large amount of zinc compared with the agglomerate as the raw material. The dust, however, contains a part of the raw material agglomerate discharged from the melting furnace. The particle size of the raw material agglomerate is normally 10 $\mu$m or more, and the zinc concentration is low. The portion that contains zinc oxide which is formed by converted reduced zinc has a particle size of normally less than 10 $\mu$m and contains large amount of zinc.

To cope with the situation, at least two duct collectors are installed. The first dust collector collects mainly the dust having a particle size of 10 $\mu$m or more, and the second dust collector collects mainly the dust having a particle size of 0.1 $\mu$m o r more. In this manner, the classified collection of dust in terms of particle size is carried out responding to the zinc concentration. The collected dust containing less zinc is returned to the treating dust to recycle thereof for increasing the zinc concentration in collected dust. An adequate type of that kind of dust collector is cyclone.

Example

An apparatus for recovering zinc from dust according to the present invention is described below referring to FIG. 8 as an example. FIG. 8 is the flow diagram of an apparatus for recovering zinc from dust according to the present invention.

An raw material dust 322 which contains zinc and which was stored in a dust hopper 321 is thoroughly mixed in a mixer 327 together with a coke 324 for reduction which was stored in a coke hopper 323 and a binder 326 which was stored in a binder hopper 325. The mixture is agglomerated into briquettes in an agglomeration unit 328 to an approximate briquette size of 15 to 30 mm in diameter and 10 to 20 mm in thickness.

The agglomerate is dried and preheated in a drying and preheating unit 329 by an exhaust gas 339, then the agglomerate is charged into a melting furnace 332 via an intermediate hopper 330 using a metering feeder 331. The melting furnace 332 holds a molten iron 333 at a temperature ranging from 1400 to 1600° C. Since the specific density of charged briquette 234 is in a range of from 1.2 to 2.5 g/cm³, which is less than that of molten iron 333, the briquettes piles in layers on the surface of molten iron.

For preventing temperature decrease of the molten iron 333, an electrode unit 335 is located at upper part of the melting furnace 332, from where arc is generated to supply the arc heat to the melting furnace 332. At the bottom section of the melting furnace, a bottom gas blowing unit 337 is located, through which nitrogen gas 338 is injected into the molten iron to agitate thereof for further increasing the reaction rate.

Iron oxide in the dust is reduced mainly by a carbonaceous material in the briquette, and is collected as iron into the molten iron. Zinc oxide is also reduced by the carbonaceous material in the dust and vaporized, then the vapor is oxidized by oxygen in air which enters into the furnace through an air inlet opened at an upper lid on the melting furnace 332. The oxidized vapor becomes fine zinc oxide particles in a size of less than 10 $\mu$m.

On the other hand, a portion of the dust containing zinc as the agglomerated raw material is degradated powdered by thermal shock of the molten iron 333, which portion is discharged to outside of the reaction system in non-reacted state. A part of iron oxide is also discharged from the surface of the molten iron to outside of the reaction system.

The discharged zinc oxide particles, non-reacted dust, and iron are collected by a dry cyclone as the first dust collector 340 which collects dust in a size of 10 $\mu$m or coarse, by a dry cyclone as the second dust collector 341 which collects dust in a size of less than 10 $\mu$m. Table 4 shows the composition of dust collected by each of the dust collectors. According to the example, the dust collected by the second dust collector 341 is stored in a product hopper 342 because the target zinc oxide concentration is set to 50% or more.

Since the dust collected by the first dust collector 340 contains less zinc than the target zinc concentration, it is returned to the dust hopper 324 via a recycle line 345. The recycled dust 346 is agglomerated again with the raw material dust 322 in the agglomeration unit 328. The agglomerate is re-charged to the melting furnace 332 and is treated by reduction on the molten iron 333.

With the above-described process, high zinc concentration dust is efficiently recovered by recycling minimum necessary amount of dust. The recovered dust is agglomerated in the agglomeration unit 343, then is supplied to smelters. The smelters treat the supplied dust as a zinc source to produce zinc.

TABLE 4

|  | Zn | Fe | Others (O, etc.) |
| --- | --- | --- | --- |
| First dust collector | 31 | 34 | 35 |
| Second dust collector | 52 | 5 | 43 |

(wt. %)

As described above, an apparatus for recovering zinc oxide according to the present invention comprises: a melting furnace that charges an agglomerated steelwork dust consisting mainly of iron oxide to a molten iron, that reduces the iron oxide in the dust in the molten iron to collect thereof into the molten iron, and that reduces and vaporizes the zinc oxide in the dust; and a means for collecting zinc in the dust. In addition, since the apparatus is further provided with an electrode unit for heating the dust and the molten iron to prevent temperature reduction of the molten iron, and with a gas blowing unit for agitating the molten iron to enhance the reducing reaction, the zinc is recovered at a high concentration with high efficiency and high productivity.

What is claimed is:

1. An apparatus for recovering zinc oxide comprising:
   a reaction furnace, into which an agglomerate is charged, for holding a molten iron;
   heating means for heating the molten iron held in the reaction furnace;
   agitating means for agitating the molten iron held in the reaction furnace; and
   recovering means for recovering a zinc oxide generated in the reaction furnace;
   wherein the recovering means comprises at least two dust collectors for collecting the dust containing zinc oxide generated from the melting furnace in order of a particle size form the coarse flue dust, the at least two dust collectors comprising
a first dust collector for collecting a flue dust having a particle size of 10 µm or more among the flue dust generated from the melting furnace; and
a second dust collector for collecting a dust having a particle size of 0.1 µm or more succeeding to the second dust collector.

2. The apparatus of claim 1, wherein the heating means and the agitating means are at least two heating burners located at an upper part of the reaction furnace.

3. The apparatus of claim 2, wherein the at least two heating burners have a first angle ranging from 50 to 80° relative to radial direction of the reaction furnace in horizontal plane, and a second angle ranging from 20 to 45° relative to horizontal plane on vertical cross section of the reaction furnace.

4. The apparatus of claim 1, wherein the recovering means comprises at least two dust collectors for collecting the dust containing zinc oxide generated from the melting furnace in order of a particle size from the coarse flue dust.

5. The apparatus of claim 4, wherein the at least two dust collector comprises:
a first dust collector for collecting a dust having a particle size of 10 µm or more among the dust generated from the melting furnace; and
a second dust collector for collecting a dust having a particle size of 0.1 µm or more succeeding to the first dust collector.

6. The apparatus of claim 4, wherein the heating means comprises an electrode unit for conducting electric arc heating.

7. The apparatus of claim 4, wherein the agitating means is located at bottom of the melting furnace.

8. The apparatus of claim 7, wherein the agitating means includes means to blow an agitation gas into the molten iron at a rate ranging from 0.1 to 2 $Nm^3$/hour per ton of the molten iron.

9. An apparatus for recovering zinc oxide comprising:
a reaction furnace, into which an agglomerate is charged, for holding a molten iron;
heating means for heating the molten iron held in the reaction furnace;
agitating means for agitating the molten iron held in the reaction furnace; and
recovering means for recovering a zinc oxide generated in the reaction furnace;
wherein the recovering means comprises at least two dust collectors for collecting the dust containing zinc oxide generated from the melting furnace in order of a particle size form the coarse flue dust,
the at least two dust collectors comprising
a first dust collector for collecting a flue dust having a particle size of 10 µm or more among the flue dust generated from the melting furnace;
a second dust collector for collecting a dust having a particle size of 5 µm or more succeeding to the first dust collector; and
a third dust collector for collecting a dust having a particle size of 0.1 µm or more succeeding to the second dust collector.

10. An apparatus for recovering zinc oxide comprising:
an agglomeration unit for agglomerating a dust containing iron oxide and zinc oxide to form an agglomerate;
a melting furnace, into which the agglomerate is charged, for holding a molten iron to reduce the agglomerate; and
dust collector means for collecting a flue dust containing zinc oxide generated from the melting furnace in order of a particle size from the coarse flue dust;
wherein said dust collector means is at least two dust collectors, and
said at least two dust collectors comprises:
a first dust collector for collecting a flue dust having a particle size of 10 µm or more among the flue dust generated from the melting furnace;
a second dust collector for collecting a flue dust having a particle size of 5 µm or more succeeding to the first dust collector; and
a third dust collector for collecting a flue dust having a particle size of 0.1 µm or more succeeding to the second dust collector.

11. An apparatus for recovering zinc oxide comprising:
an agglomeration unit for agglomerating a dust containing iron oxide and zinc oxide to form an agglomerate;
a melting furnace, into which the agglomerate is charged, for holding a molten iron to reduce the agglomerate; and
dust collector means for collecting a flue dust containing zinc oxide generated from the melting furnace in order of a particle size from the coarse flue dust;
wherein said dust collector means is at least two dust collectors,
said at least two dust collectors comprising
a first dust collector for collecting a dust having a particle size of 10 µm or more among the dust generated from the melting furnace; and
a second dust collector for collecting a dust having a particle size of 0.1 µm or more succeeding to the first dust collector.

* * * * *